United States Patent
Hergott et al.

(10) Patent No.: US 6,572,464 B1
(45) Date of Patent: Jun. 3, 2003

(54) METHOD AND MEANS FOR RAPID LOADING OF CASING-BEARING SLEEVES ON A SAUSAGE MAKING MACHINE

(75) Inventors: Steven P. Hergott, Ankeny, IA (US); David S. Hamblin, Norwalk, IA (US); Michael J. Hardy, West Des Moines, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 10/210,122

(22) Filed: Aug. 1, 2002

Related U.S. Application Data (63) Continuation-in-part of application No. 10/160,931, filed on May 31, 2002.

(51) Int. Cl.$^7$ ............................................. A22C 11/00
(52) U.S. Cl. ......................................................... 452/33
(58) Field of Search .............................. 452/30–33, 39, 452/45, 35

(56) References Cited

U.S. PATENT DOCUMENTS

| | | | | |
|---|---|---|---|---|
| 3,480,449 A | * | 11/1969 | Sumption | 426/413 |
| 4,438,545 A | * | 3/1984 | Kupcikevicius et al. | 452/32 |
| 4,489,460 A | * | 12/1984 | Nausedas | 452/34 |
| 4,991,260 A | * | 2/1991 | Nausedas | 452/35 |
| 5,354,228 A | * | 10/1994 | Smith et al. | 452/47 |

* cited by examiner

Primary Examiner—Thomas Price

(57) ABSTRACT

A method for rapid loading of casing-bearing sleeves on the stuffing tube of a sausage machine, provides for placing the preloaded sleeves on a feeder mechanism and selectively and sequentially moving the sleeves into registering position with the discharge end of an emulsion stuffing tube; sequentially moving the stuffing tube into each of the sleeves and extruding emulsion through the stuffing tube into the casing mounted on the sleeve until the sleeve is slidably removed from the tube caused in part by the movement of emulsion entering the casing. The apparatus has a fixture suitably movably mounted on the machine with a plurality of preloaded sleeves thereon for sequential movement for selective alignment of the sleeves with the stuffing tube for sequential filling of the casings with emulsion.

4 Claims, 7 Drawing Sheets

METHOD AND MEANS FOR RAPID LOADING OF CASING-BEARING SLEEVES ON A SAUSAGE MAKING MACHINE

CROSS REFERENCE TO RELATED APPLICATION

This application is a continuation-in-part of Ser. No. 10/160,931, filed May 31, 2002.

BACKGROUND OF THE INVENTION

Stuffing sausages with emulsion normally involves pumping emulsion through a hollow stuffing tube towards a discharge end of the tube. A hollow tubular casing material is slidably mounted on the outside of the tube with an otherwise open end extending just beyond the discharge end of the tube. The open end of the casing is then closed in any convenient manner. The emulsion extruded out of the stuffing tube enters the casing which becomes filled, with the pressure on the pumped emulsion slidably moving the casing off of the sleeve. The filled casing is then formed into links through conventional means. This process works well with artificial casings which can be shirred or telescopically compressed so that a casing thirty feet or so in length can be compressed into a shirred condition of slightly more than a foot in length, thus allowing many sausages to be made before a new shirred casing is placed on the tube.

However, in the case of natural casings comprised of the intestines of certain animals, the sausage making process is substantially slowed because the natural casings vary in length and are substantially shorter than artificial casings. As a result, the natural casings have to be replaced at a high frequency, thus creating substantial down time for the machine and casings are filled at a slow frequency.

It is therefore a principal object of this invention to provide a method and means for rapid loading of casing-bearing sleeve on a sausage machine.

A further object of this invention is to provide a method and means for stuffing natural casings with sausage emulsion which will greatly accelerate the stuffing of natural casings by preloading the casings on a quickly positioned sleeve so that the preloaded sleeve can be instantly placed on the primary stuffing tube without manually inserting the natural casing over the end of the stuffing tube, at the time the casing is to be filled, and by mounting a plurality of sleeves on a delivery mechanism for rapid sequential filling of casings one after another.

A still further object of this invention is to provide a convenient arrangement for the sleeve to be automatically removed from the stuffing tube and the delivery system after the natural casing has been filled with emulsion upon leaving the outer surface of the sleeve.

A still further object of the invention is to provide a sleeve carousel that can carry a plurality of preloaded casing sleeves that can individually be movably positioned for filling the casing as soon as the casing on a preceding sleeve has been filled.

A still further object of this invention is to provide a system whereby a sleeve that is free from a casing thereon that has been filled can be easily removed from the machine for further similar use.

Another object of this invention is to provide a method and means for rapid loading of casing-bearing sleeves on a sausage making machine which is economical and efficient to use.

These and other objects will be apparent to those skilled in the art.

SUMMARY OF THE INVENTION

A method of stuffing sausage casings with sausage material involves taking a plurality of casings of different lengths; pre-loading each of the casings on elongated hollow open ended sleeves shorter than the casings and having a diameter less than the casings by telescoping the casing on the outer surface of the sleeves; slidably sequentially mounting the sleeves on the open end of a stuffing tube of a sausage making machine via a rapid loading system; extruding emulsion through the stuffing tube into the casing mounted on the sleeve until the casing is slidably removed from the sleeve caused in part by the movement of emulsion entering the casing; removing the sleeve from the stuffing tube; repeating the use of the sleeve by preloading the sleeve with another natural casing; and sequentially filling the casings on the remaining preloaded sleeves with emulsion via the rapid loading system in accordance with the foregoing steps.

A sausage making machine has a frame, an emulsion pump, and a hollow stuffing tube connected to the pump and having a discharge end. A hollow open-ended sleeve is slidably mounted on the stuffing tube and has a discharge end registering with the discharge end of the stuffing tube. The sleeve is preloaded with a length of casing which extends over at least a portion of the length of the sleeve with its end being located just beyond the discharge ends of the stuffing tube and the sleeve. A plurality of casing loaded sleeves are mounted on a rapid delivery system so that the sleeves are sequentially positioned on the stuffing tube so that a radial flange on the end of the sleeve opposite the discharge end thereof abuts a radial flange on the stuffing tube to automatically insure that the discharge end of the sleeve and tube register with each other.

After the preloaded sleeve is in place on the stuffing tube, the tube is conventionally moved longitudinally forwardly towards a twisting and linking mechanism. When the casing is filled, the tube with the sleeve thereon is longitudinally moved away from the twisting and linking mechanism and the sleeve automatically drops from the loading system to a suitable container for reuse without having to be handled by the machine operator. The loading system thereupon delivers another casing loaded sleeve to position of alignment with the stuffing tube so that the process can be repeated.

While the foregoing method and apparatus of preloading sleeves with casings substantially enhances the filling of casings with emulsion, the present invention facilitates the process even further by providing a method and means for loading a plurality of sleeves bearing casings on a sausage making machine and serially moving them to a sausage filling position immediately after the casing on a preceding sleeve has been filled. The method specifically provides for placing the preloaded sleeves on a feeder mechanism and selectively and sequentially moving the sleeves into registering position with the discharge end of an emulsion stuffing tube; sequentially moving the stuffing tube into each of the sleeves and extruding emulsion through the stuffing tube into the casing mounted on the sleeve until the casing is slidably removed from the sleeve caused in part by the movement of emulsion entering the casing.

The apparatus has a fixture suitably movably mounted on the machine with a plurality of preloaded sleeves thereon for sequential movement for selective alignment of the sleeves with the stuffing tube for sequential filling of the casings with emulsion.

DESCRIPTION OF THE EMBODIMENTS OF THE INVENTION

Figure 1:
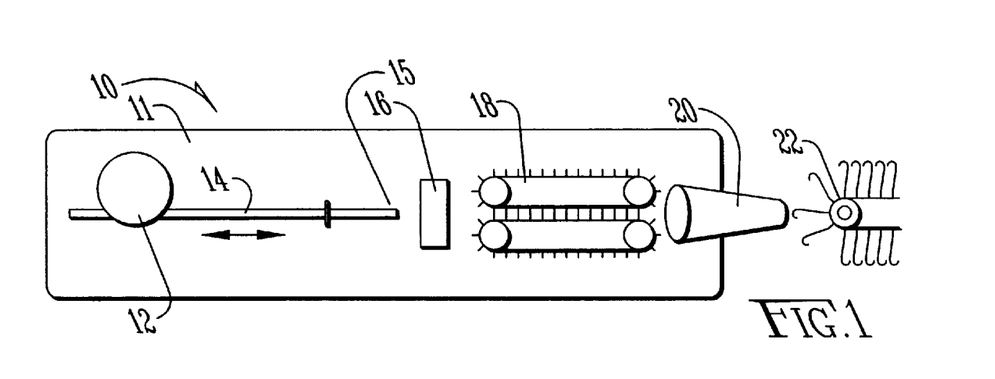
FIG. 1 is a plan view of a sausage making machine showing the conventional components.

With reference to FIG. 1, a conventional sausage making machine 10 has a frame 11, a pump 12 connected to a source of emulsion (not shown), a slidable stuffing tube 14, a twisting mechanism 16, a linking mechanism 18, a discharge horn 20, and a conveyor 22.

With reference to FIGS. 2, 3, 4, 5 and 6, a carousel plate assembly 24 is comprised of spaced apart plates 26 and 28 which are rotatably mounted with shaft 30. The plates 26 and 28 are spaced in parallel relation by any convenient spacer elements (not shown). Shaft 30 has a center axis 31 (FIG. 6) parallel to the center axis of stuffing tube 14 having an open end 15. Semi-circular notches 32, 34, 36 and 38 are cut in the plates 26 and 28 at three o'clock, six o'clock, nine o'clock and twelve o'clock positions. The numeral 40 (FIG. 4) designates the centers of the semi-circular notches 32–38. The numeral 42 designates the center axis of the stuffing tube 14.

Figure 2:
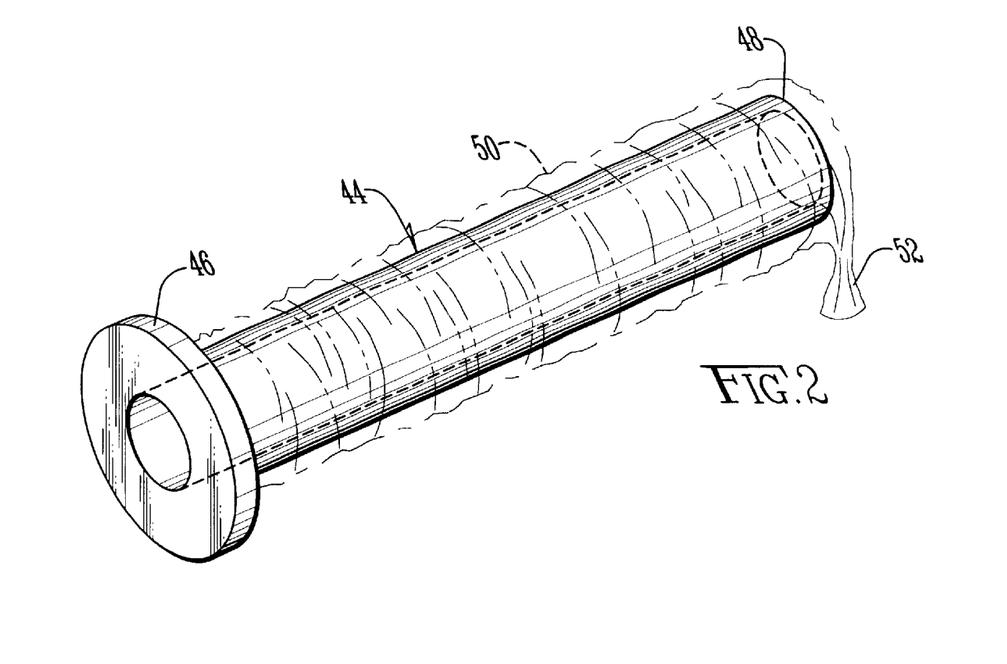
FIG. 2 is a large scale perspective view at an enlarged scale showing a sleeve preloaded with a casing thereon.

With reference to FIG. 2, sleeve 44 has a circular thin flange 46 at one of its ends opposite to the discharge end 48. A casing 50 normally is preloaded on the sleeve 44 and an end 52 of the casing 50 which extends beyond the discharge end 48.

Figure 3:
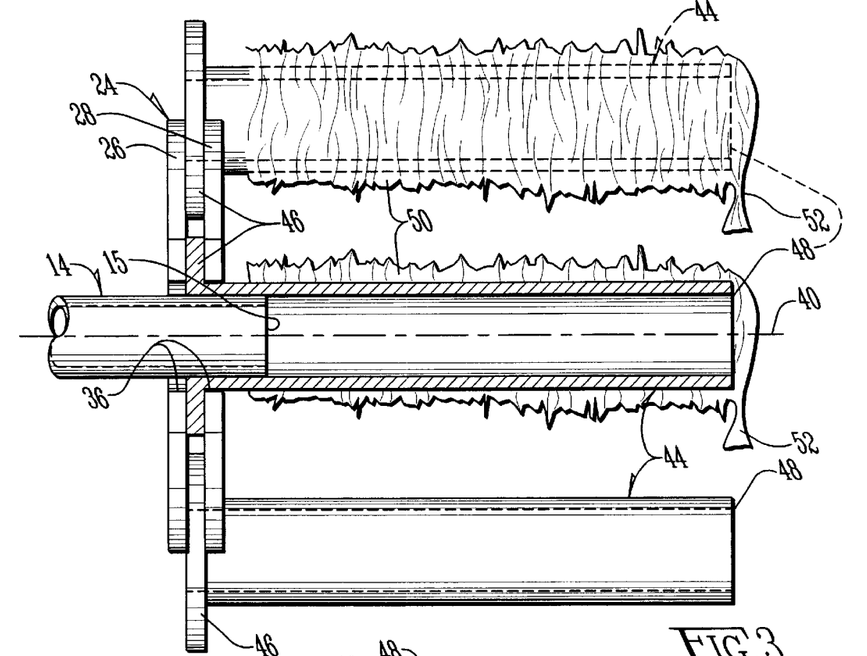
FIG. 3 is a longitudinal sectional view of a first embodiment of the invention showing a carousel mounting unit.
Figure 4:
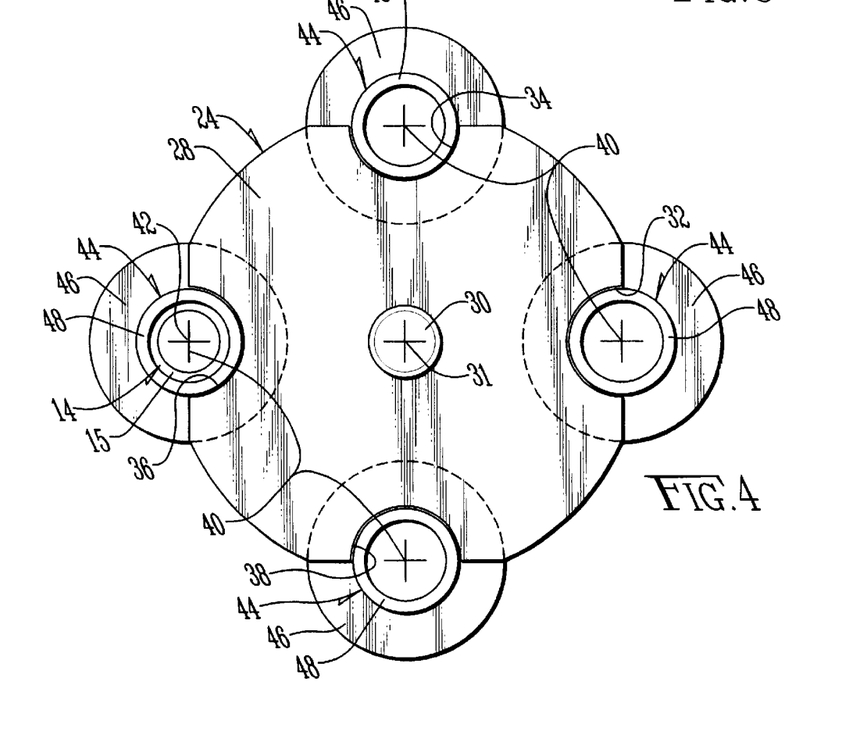
FIG. 4 is an end elevational view thereof as seen from the righthand end of FIG. 3.
Figure 5:
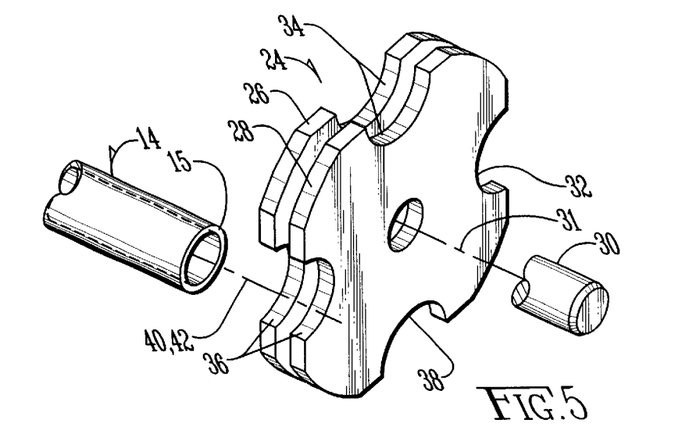
FIG. 5 is a frontal perspective view of the carousel mounting unit with respect to a withdrawn stuffing tube.
Figure 6:
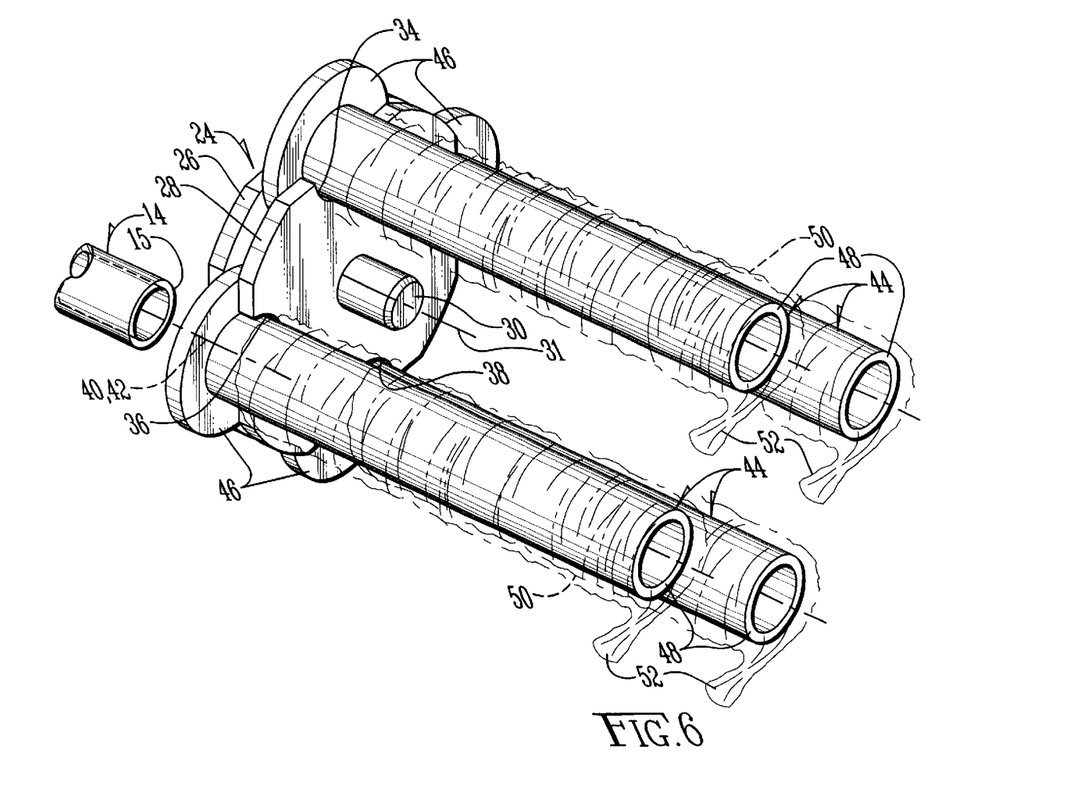
FIG. 6 is a view similar to that of FIG. 5 but shows the preloaded sleeves mounted on the carousel.

In operation, the structure of FIGS. 2, 3 and 4 is operated as follows: sleeves 44 with natural casings 50 mounted thereon, as described above, are inserted between space plates 26 and 28 in semi-circular notches 32 and 34; respectively and extend outwardly from the carousel plate assembly 24 as best shown in FIG. 3. The sleeves 44 are detachably held within the semi-circular notches 32 and 34 by means of the inner portion of flanges 46 extending between the space plates 26 and 28, with that space being substantially equal to the thickness of the flanges 46.

The carousel plate assembly 24 is thereupon rotated in a counter-clockwise direction as viewed in FIG. 4 so that the sleeve 44 in the semi-circular notch 34 then moves from a twelve o'clock position to a nine o'clock position to register in alignment with the stuffing tube 14. This is done while the stuffing tube 14 is in a withdrawn position at a location to the left of the carousel plate assembly 24 as viewed in FIG. 3. The stuffing horn 14 is thereupon conventionally moved in a forward direction to insert its discharge end 15 into the hollow sleeve 44 as best shown in FIG. 3. The pump 12 is then actuated to extrude emulsion through stuffing tube 14 as the emulsion exits stuffing tube 14 and proceeds to the discharge end 48 of the sleeve 44, the casing 50 begins to fill, and the pressure of the emulsion pulls the casing 50 off of the outer surface of the sleeve 44 and into the twisting mechanism 16 and thence into the linking mechanism 18. Contemporaneous with the casing 50 leaving the outer surface of the sleeve 44, the pump is stopped so that further emulsion is not extruded, and tube 14 is withdrawn to the left as seen in FIG. 3 so that it no longer penetrates the interior of the sleeve 44.

When carousal plate assembly 24 rotates in a counter-clockwise direction (FIG. 5), the semi-circular notches 32 on the carousel plate assembly were moved from a three o'clock position as seen in FIG. 4 to the twelve o'clock position. Similarly, the semi-circular notches 38 in the carousel plate assembly as seen in FIG. 4 moved from the six o'clock position to the three o'clock position. A newly preloaded sleeve 44 with a casing 50 thereon, is thereupon mounted within the notches 38, now located at the three o'clock position. When the sleeve on flange 44 in notch 34 has completed its casing filling operation as described heretofore, the carousel plate assembly 24 is rotated another ninety degrees as seen in FIG. 4 so as to move the sleeve 44 in notch 34 to the nine o'clock position in registry with the withdrawn stuffing tube 14. This rotation takes place through any convenient power means (not shown) connected to shaft 30. When this takes place, the "empty" sleeve 44 in notch 34 moves to the six o'clock position and drops vertically downwardly to a suitable container where it can be reloaded with a new casing 50 for further use.

The foregoing steps are continually repeated so that sleeves at the three o'clock and twelve o'clock positions are sequentially moved to the nine o'clock position, thence filled with emulsion as described above, and thence rotated a further 90 degree increment so that the sleeve remaining from the filled casing at the nine o'clock position falls away from the carousel plate assembly when it reaches the six o'clock position. The rotation of the carousel plate assembly 24 is coordinated with the withdrawal and thence the penetration of the stuffing tube 14 as described above. As previously indicated, the tube 14 needs to be withdrawn from the sleeve in the nine o'clock position to permit rotation of the carousel assembly in a further 90 degree increment to allow the next sleeve 44 to be in alignment with the stuffing tube. At that stage, the stuffing tube is then moved to a penetrating position within the sleeve 44 at the nine o'clock position so that the process can be repeated.

Also, as previously indicated, whenever an empty slot appears at the three o'clock position, it is again loaded with a pre-loaded sleeve 44 so that the process can continue without interruption.

Figure 7:
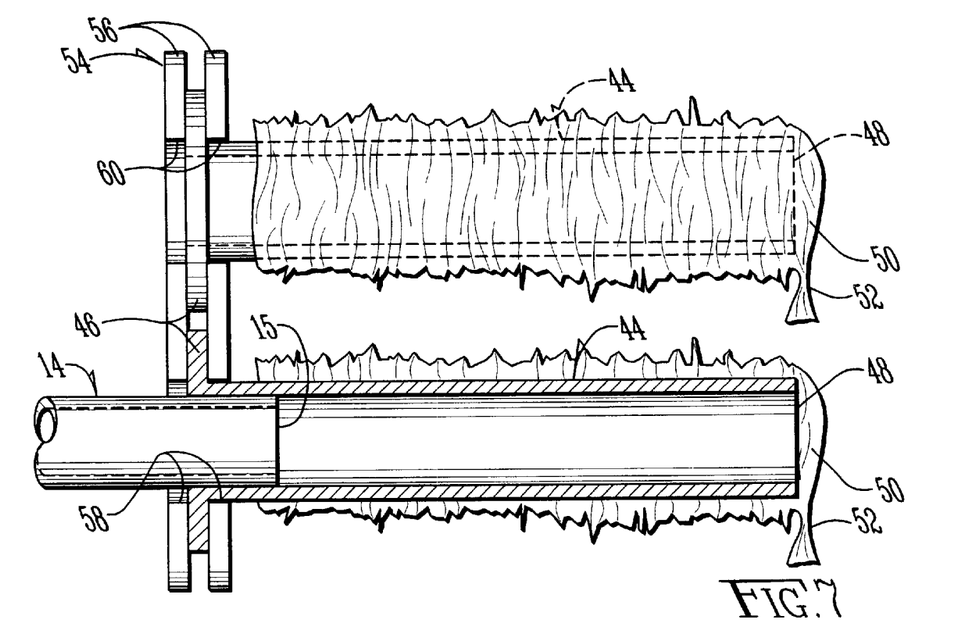
FIG. 7 is a plan view of a second embodiment of the invention using a laterally extending magazine to mount the preloaded sleeves.
Figure 8:
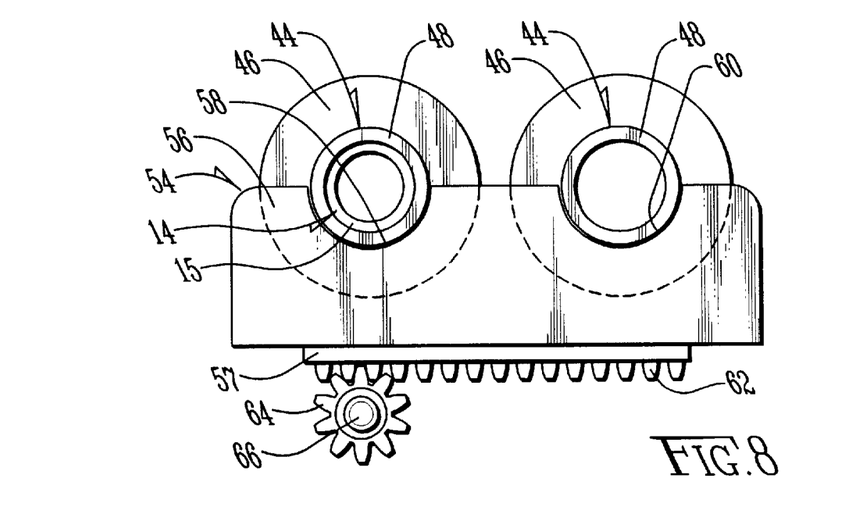
FIG. 8 is an elevational view of the righthand end of FIG. 7.
Figure 9:
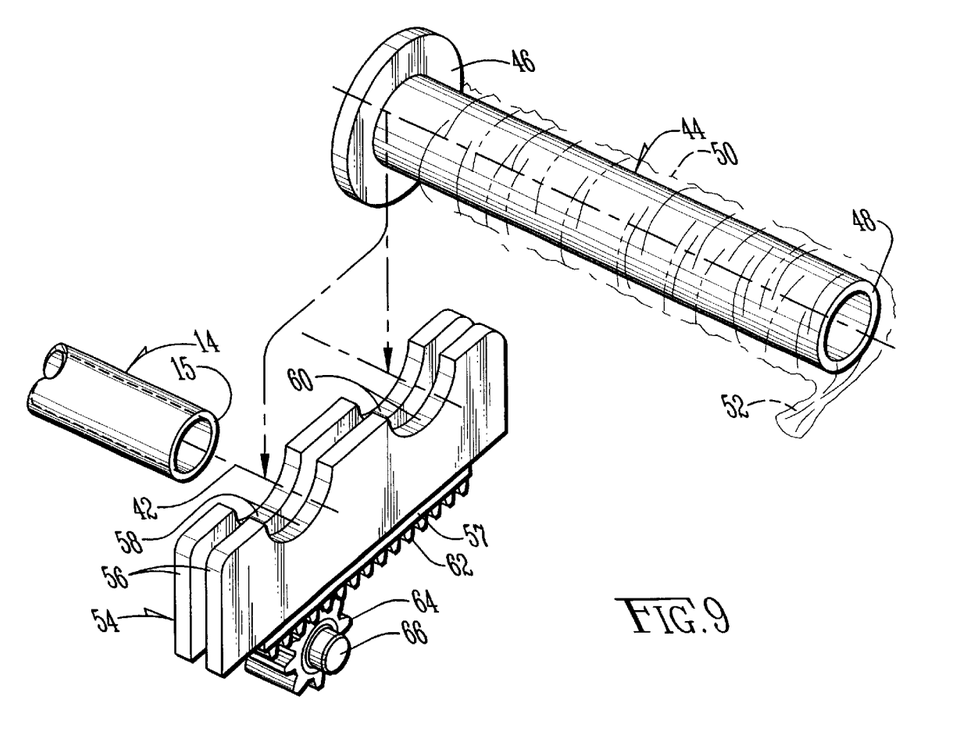
FIG. 9 is an exploded perspective view showing the interrelation of the stuffing tube, and the magazine and a preloaded sleeve.

In regard to the alternate form of the invention in FIGS. 7, 8 and 9, an elongated rack 54 is provided and is comprised of a pair of spaced plates 56. An elongated rack element 57 is located between the plates and is rigid with the plates. A pair of semi-circular notches 58 and 60 are provided in the upper edges of the plates opposite the rack 57 which are similar to the semi-circular notches appearing in the previous embodiment in FIG. 4.

Teeth 62 are provided in rack 57. A conventional pinion 64 rotatably mounted with pin 66 is located directly below the rack 57 and the conventional teeth on the pinion mesh with the teeth 62 on the rack so that the rotation of pinion 64 will cause the longitudinal displacement in either a right hand or left hand direction of the rack 54 as best shown in FIG. 8. The pinion 64 is rotated by any suitable conventional means.

The operation of rack 54 serves to sequentially register notches 58 or 60 with the tube 14, FIGS. 7 and 9, with the flange 46 on the sleeve 44 holding the sleeves 44 in an outwardly projecting position with respect to the rack, in much the same way that the sleeves 44 extended outwardly from the carousel plate assembly 24 in FIG. 3. The pinion 64 is rotated a sufficient distance to align notch 58 with the axis of stuffing tube 14 (FIG. 7) whereupon the then withdrawn tube 14 will be actuated to enter the center of sleeve 44 (FIG. 7) so that the filling of casing 50 can take place just as it did when sleeves 44 were mounted on the carousel plate assembly 24 in FIG. 3.

When the sleeve 44 in one of the notches 58 and 60 has had the casing 50 thereon filled and removed from the outer surface of the sleeve 44, the stuffing tube 14 is withdrawn; the pinion 64 advances the rack 54 so that the sleeve 44 in the other semi-circular notch aligns itself with tube 14, and the process is repeated. As the semi-circular notches 58 and 60 have the casings thereon filled, they are replaced with additional preloaded sleeves so that the process with the longitudinal rack can be continuously repeated.

Figure 10:
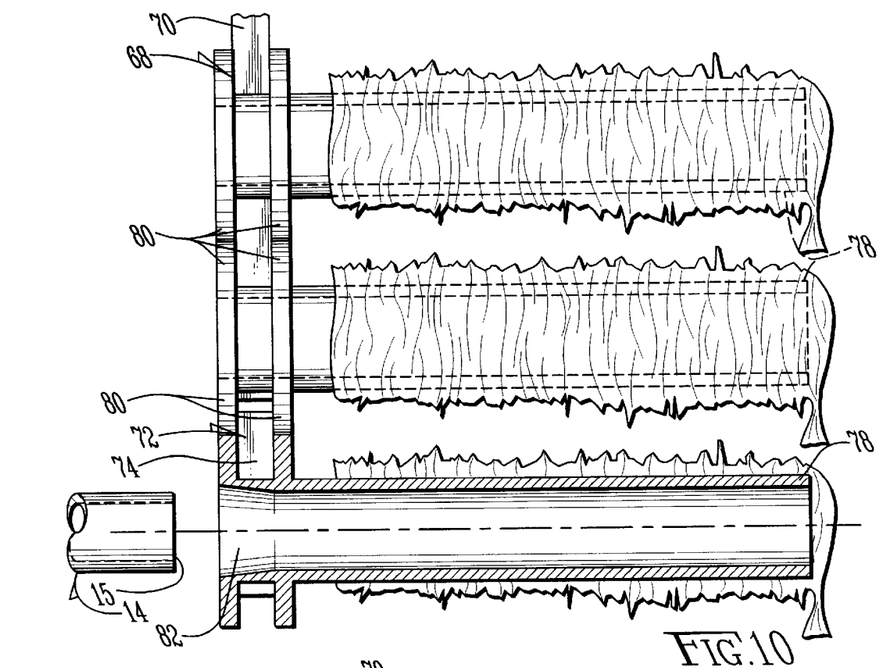
FIG. 10 is a longitudinal sectional view of a third embodiment of the invention showing a vertically positioned magazine for modified preloaded sleeves with a release mechanism for the sleeves.
Figures 11, 11A:
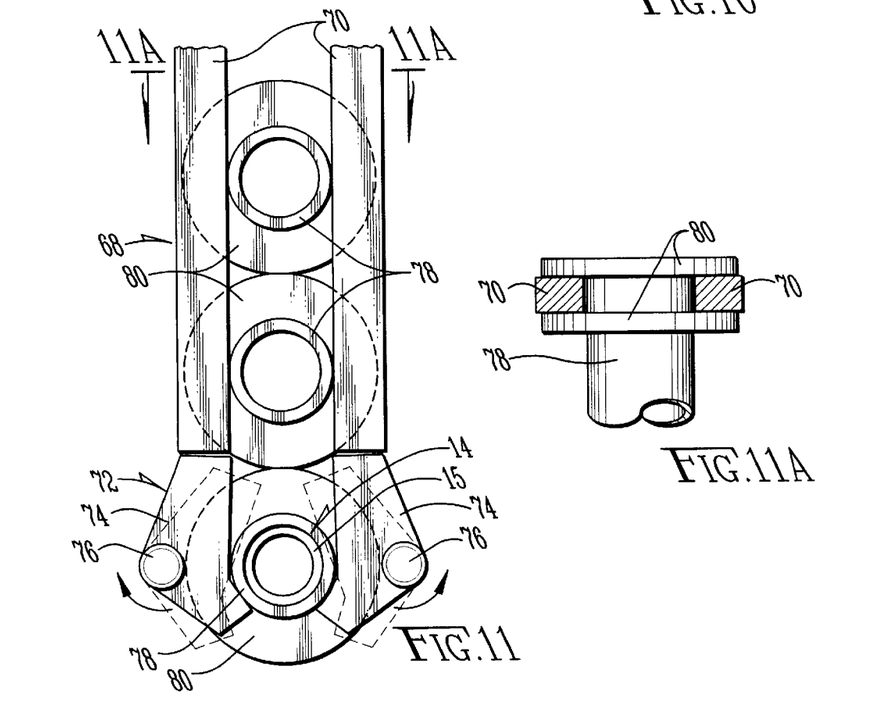
FIG. 11 is an end elevational view of FIG. 10.
FIG. 11A is a sectional view taken on line 11A—11A of FIG. 11.
Figures 12, 13:
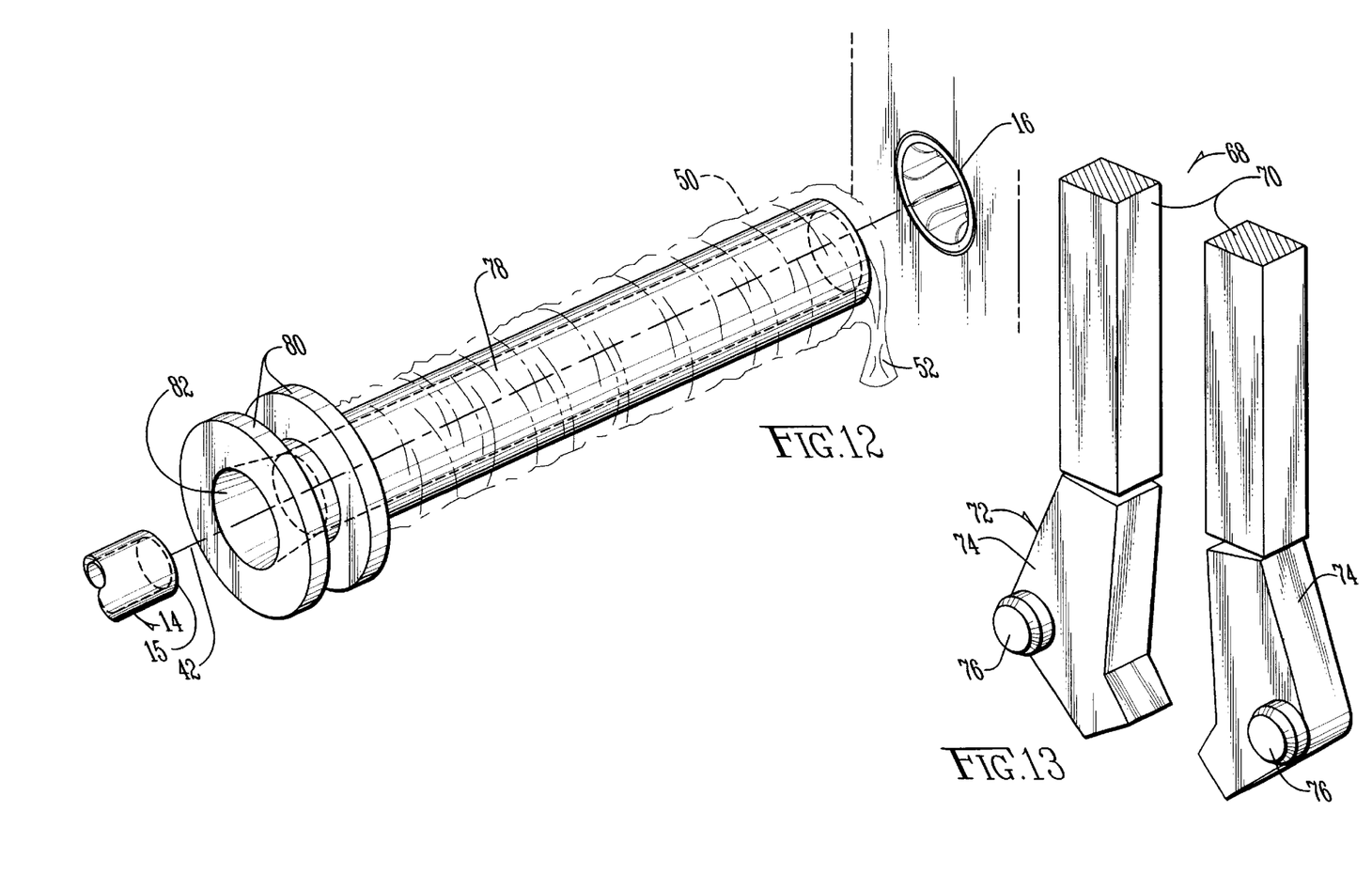
FIG. 12 is an exploded perspective view at an enlarged scale showing the modified preloaded sleeve with the magazine of FIG. 10 showing the interrelation of the sleeve with its conventional stuffing tube and the conventional twister mechanism.
FIG. 13 is an enlarged scale perspective view of the magazine of FIGS. 10–12.

With reference to a further alternative embodiment of the invention in FIGS. 10–13, a gravity feed mechanism 68 is provided and is comprised with a pair of spaced vertical bars 70 having a release mechanism 72 at the lower ends thereof. The release mechanism is comprised of a pair of opposite pivotal jaws 74 (FIGS. 11 and 13) which are pivotal on pins 76. With reference to FIG. 12, a special sleeve 78 is provided which has a pair of spaced flanges 80 on one of its ends which are spaced sufficiently to be slidably stacked between the vertical bars 70 (see FIG. 11A). The interaction of the flanges 80 with the bars 70 maintains the sleeve 78 at right angles to the feed mechanism 68 (FIG. 10). The hollow bore of sleeve 78 is slightly tapered at 82 adjacent its inlet end as best shown in FIG. 11A.

The purpose of gravity feed mechanism 68 is to sequentially allow the lowermost sleeve 78 to drop between the jaws 74 so that the center line of the sleeve 78 is in alignment with the center line of the stuffing tube 14. The discharge end 15 of the tube 14 must be inserted into, and thence withdrawn during the casing filling operation just as was the case in the prior two embodiments.

When the casing 50 on the lowermost sleeve 78 is filled, in the manner described above, and when the stuffing tube 14 is withdrawn from the tapered inlet end 82 of the sleeve 78, the jaws 74 are moved to an outer position, thus releasing the lowermost sleeve 78 which is dropped from the feed mechanism 68 into a suitable container for subsequent use. When the jaws 74 are moved back to their normally closed position, the next sleeve 78 drops into position, and the process is repeated. Additional, preloaded sleeves can be dropped into the upper end of the feed mechanism 68 as sleeves 78 are dropped from the lower end of the mechanism by the open jaws 74.

The inventions disclosed herein are useful for stuffing a variety of casings, including natural casings. Also, the casings normally are stuffed with meat emulsion, but other plastic food emulsions can be used.

It is therefore seen that this invention will permit the rapid loading of the preloaded sleeves wherein the objects of the inventions will be fully accomplished.

We claim:

1. A method of stuffing natural casings with sausage emulsion, comprising, taking a plurality of natural casings of different lengths, preloading each casing on elongated hollow open ended sleeve shorter than the casing and having a diameter less than the casing by telescoping the casing on the outer surface of the sleeve, placing the preloaded sleeves on a feeder mechanism and selectively and sequentially moving the sleeves into registering position with the discharge end of a stuffing tube, and sequentially moving the stuffing tube into each of the sleeves and extruding emulsion through the stuffing tube into the casing mounted on the sleeve until the casing is slidably removed from the sleeve caused in part by the movement of emulsion entering the casing.

2. The method of claim 1 providing the further step of sequentially dropping the sleeves from the feeder mechanism as the casing on each sleeve is filled with emulsion.

3. The method of claim 1 wherein a plurality of preloaded sleeves are mounted on a selectively rotatable carousel plate, and the stuffing tube is selectively extendable and withdrawable into and from each sleeve as the sleeves are moved into registering position with the stuffing tube when it is withdrawn, and wherein the stuffing tube is moved into one of the sleeves slidably mounted thereon toward a twisting and linking station for extruding emulsion into the casing to fill the casing then on the stuffing tube, then withdrawing the stuffing tube from the sleeve then mounted thereon when the casing thereon is filled and then sequentially rotating the carousel plate to repeat the foregoing steps in regard to the remaining preloaded sleeves on the carousel.

4. A sausage making machine having a frame, an emulsion pump, and a hollow stuffing tube with an open discharge end for discharging emulsion from the pump, comprising, a selectively rotatable carousel plate mounted on the machine, means connected to the carousel plate for selectively rotating the same, a plurality of hollow open ended elongated sleeves mounted on the carousel plate and having open discharge ends, each sleeve being preloaded with a natural casing having a diameter and length greater than that of the sleeve, the casing being in telescopic condition on the outer surface of the sleeve, means for longitudinally selectively moving the stuffing tube into and out of each sleeve as the sleeves are moved into registering position with the stuffing tube when it is longitudinally moved to a withdrawn position, a twisting and linking station located on the machine downstream from the stuffing tube so that when the stuffing tube is moved longitudinally to penetrate a sleeve, the sleeve will be moved toward the twisting and linking station and the casing thereon will be filled with emulsion extruded from the discharge end of the stuffing tube and wherein longitudinal movement of the stuffing tube in the opposite direction will withdraw the stuffing tube from the sleeve, and wherein further rotation of the carousel plate will register another preloaded sleeve with the stuffing tube to permit penetration of the sleeve by the stuffing tube to sequentially fill the casing thereon.

* * * * *